Aug. 8, 1939.  G. A. TINNERMAN  2,168,721
BOLT FASTENING DEVICE AND THE LIKE
Filed April 15, 1939
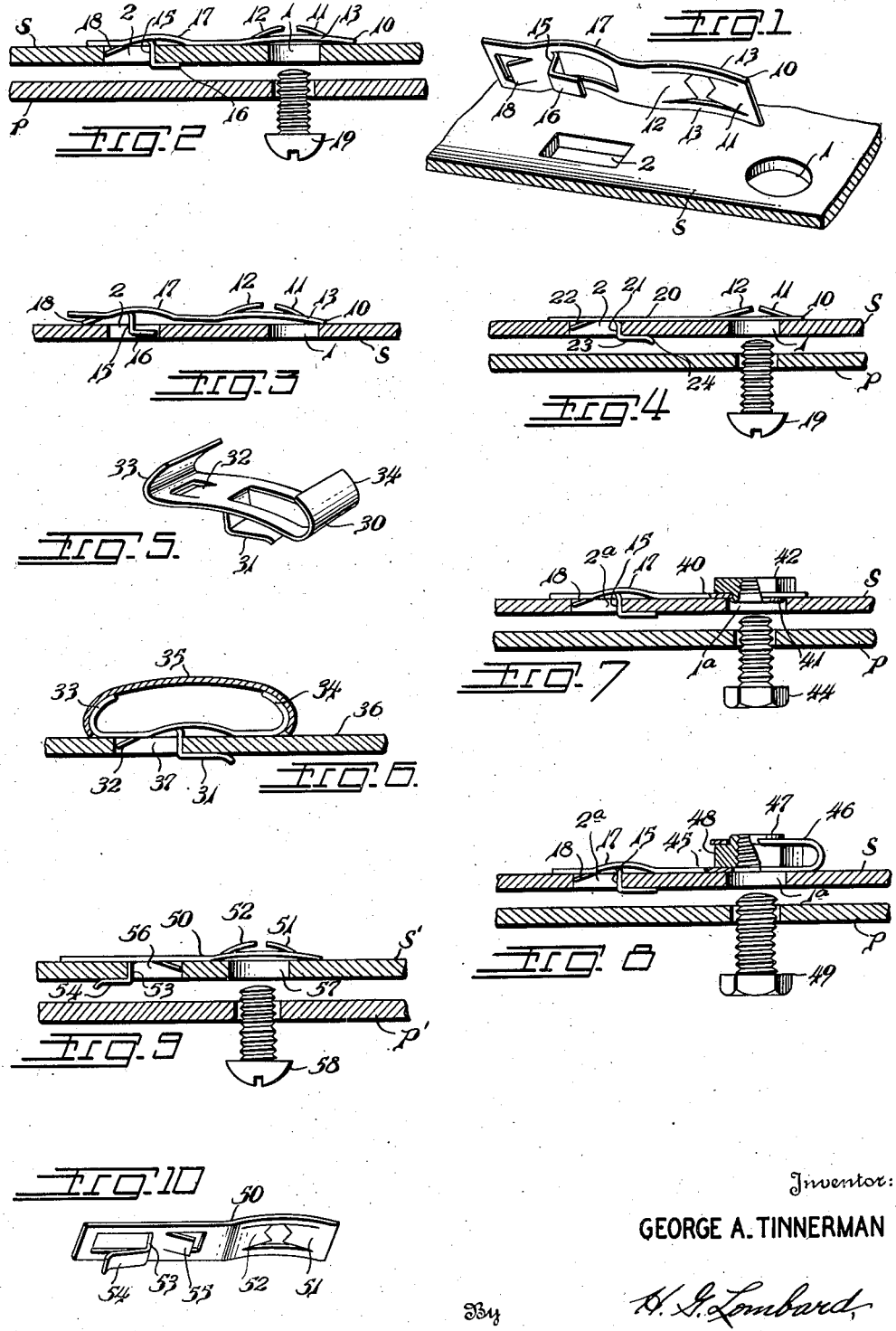
Inventor:
GEORGE A. TINNERMAN Patented Aug. 8, 1939

2,168,721

UNITED STATES PATENT OFFICE 2,168,721

BOLT FASTENING DEVICE AND THE LIKE

George A. Tinnerman, Rocky River, Ohio, assignor to Albert H. Tinnerman, Cleveland, Ohio Application April 15, 1939, Serial No. 268,085

14 Claims. (Cl. 85—32)

This invention relates to fastening devices adapted for ready application to an apertured supporting structure to provide the same with means for securing a cooperating part thereto or for the purpose of securing another structure, object or article of manufacture to said supporting structure. The present application is a continuation in part of prior copending application Serial Number 119,415 filed January 7, 1937.

More particularly, the invention is directed to various forms of fastening devices provided with attaching means which may be readily interlocked to a sheet metal supporting structure, for example, together with means for the reception of a screw fastener for securing a cooperating part to the supporting structure, or equivalent means adapted to retain an object or part in applied mounted position on such supporting structure.

A primary purpose of the invention is to provide a sheet metal fastening device of this character that may be inexpensively constructed with an improved type of attaching means by which the device may be easily and quickly slid into fastening position in interlocked engagement with the supporting structure, and retained in such fastening position against inadvertent disconnection or accidental removal without the use of extraneous bolts, screws, rivets, welding or the like attaching means.

Another principal object of the invention is to provide an improved arrangement for interlocking a sheet metal fastening device to one side of a panel-like structure by providing an attaching finger thereon which may be inserted in a hole in said structure and positioned in locking engagement therewith by sliding the fastener to final applied position in which the fastener is fixedly and rigidly retained on said structure in position to receive a threaded fastener securing a cooperating part thereto or for mounting an object or article of manufacture thereon.

A further object of the invention is to provide an attaching means in such a sheet metal fastening device which is adapted for use with supporting structures of various thicknesses.

A more specific object is for the provision of a sheet metal bolt fastening device of the kind described provided with an improved form of attaching means comprising distinct, cooperating attaching finger and locking detent elements, the attaching finger being inserted in an assembling opening in a supporting structure and positioned in locking engagement therewith by sliding the fastening device to final applied position in which the locking detent serves to retain the same in positive locked assembled relation on said supporting structure.

Still another object is to provide a fastening device having such an attaching means in which the locking detent, in the applied fastening position of the device, is designed to engage in the assembling opening or in a different aperture in the supporting structure to prevent retrograde sliding movement and inadvertent disconnection or displacement of the fastening device from applied securing position.

Further objects and advantages and other new and useful features in the construction, arrangement and general combination of parts of the invention will be readily apparent to those skilled in the art as a description thereof proceeds with reference to the accompanying drawing in which like reference characters designate like parts throughout the same and in which—

Fig. 1 shows in perspective a fragment of a supporting structure as prepared for a form of bolt fastening device of the invention shown about to be applied to fastening position thereon;

Fig. 2 is a sectional view showing the fastening device in applied position on the supporting structure for receiving a bolt fastening securing a cooperating part thereto;

Fig. 3 is a sectional view illustrating the initial step in attaching the fastener to the supporting structure;

Fig. 4 is a view similar to Fig. 2 showing an alternate arrangement of the attaching portion of the fastening device;

Fig. 5 is a perspective of another form of the fastening device as embodied in a retainer for mounting a molding or the like channel-shaped object onto a supporting structure;

Fig. 6 is a sectional view of a molding or similar finishing object as mounted onto the supporting structure by the fastening device of Fig. 5, represented in edge elevation;

Fig. 7 shows a further embodiment of the invention in which the fastening device serves as a means for retaining a common threaded nut in fastening position on an apertured supporting structure;

Fig. 8 is a similar view of another form of the fastening device employed as a nut retaining means;

Fig. 9 is a sectional view showing another embodiment of the invention in which the fastening device is provided with a modified form of attaching means; and, Fig. 10 is a perspective of the bolt fastening device or the like represented in Fig. 9.

Referring now more particularly to the drawing, it will be readily understood that the improved fastening devices of the present invention are of general utility and may be readily designed for use in various installations in proportion to the size and contour of the parts secured. The devices are particularly suited for use in providing an apertured supporting structure with means for securing a cooperating part thereto entirely from one side thereof as required in a blind location for example, and in this relation, a preferred embodiment of the invention relates to the provision of a fastening device having screw threaded fastener receiving means and otherwise comprising an attaching means designed to hold the fastening device in a self retaining position on the supporting structure preparatory to the application of a threaded fastener thereto for securing a cooperating part to such supporting structure. In other installations, the fastening devices may be provided in the manner of substantial retainers for common threaded nuts or other retaining means for securing a molding or the like object or article of manufacture to be mounted on the supporting structure in a substantially locked fastening engagement under continuously effective spring tension.

Figs. 1 to 3 inclusive of the drawing show a preferred embodiment of the invention in connection with a fastening device comprising a substantial locking plate portion provided with threaded fastener receiving means for engaging a bolt or screw fastening securing a cooperating part to a supporting structure. The letter S designates generally the supporting structure which may be of any suitable material such as sheet metal, wood, fiber board, or the like; however, inasmuch as the instant invention is employed mainly in metallic structures, the same is usually in the form of a metallic panel or plate-like element provided with the necessary perforations along which the object or part to be secured thereto extends in mounted position thereon. As best seen in Fig. 1, in order to adapt the sheet metal supporting structure S for use with a fastening device of the present invention, a bolt passage 1 is provided therein together with an assembling opening or slot 2 at a point suitably spaced from said bolt passage. Inasmuch as such an assembling slot is simple in outline, it will be appreciated that it may be provided with little added expense in the same punching operation by which the necessary bolt passage 1, would be provided in such a bolt fastening installation in any event. Preferably, the bolt passage is made of a size somewhat larger than necessary to receive the threaded fastener in order that the same may freely pass therethrough and be secured in any of several positions of adjustment as may be necessary or desirable.

The preferred form of the fastening device, shown in Fig. 1, is constructed most economically from a relatively small, inexpensive blank of sheet metal best provided in the manner of a simple, rectangular section severed from strip stock without loss or waste of material whatsoever. Any suitable sheet metal may be employed but preferably of a spring metal nature such as spring steel or cold rolled steel having spring characteristics and otherwise of a much greater tensile and compressive strength than the supporting structure with which the fastening device is employed. The fastening device may of course assume any desired shape or configuration but when in the form of such a rectangular section, is most practically suited for having an end portion thereof prepared with integral bolt or screw thread engaging means presenting a substantial locking plate portion 10 adapted to receive a threaded fastener securing a cooperating part or object in an installation such as shown in Fig. 2.

The locking plate portion of the fastening device thus provided comprises end and bridge portions between which integral tongues 11, 12, or similar bolt engaging means are pressed, extruded, or otherwise struck and formed to project out of the plane thereof for threadedly engaging a bolt or screw fastening substantially in the manner of a nut. The said bridge portions 13 provide, what may be termed, the body of the locking plate portion which body is so formed in the stamping operation as to present a generally concave resilient base from which the tongues extend upwardly in substantial ogee formation with the extremities thereof so spaced as to lie on a helix corresponding substantially to the pitch of the threads of the bolt fastening to be employed for most effective, uniform threaded engagement therewith in applied fastening position.

Such integral bolt engaging means in the locking plate portion of the fastening device may, of course, be provided in any other suitable form or construction depending on the strength required and the use to which the device is put, so long as the elements thereof threadedly engage with the bolts as they are driven home. However, it has been found that such bolt receiving means prepared in the form of cooperating tongues 11, 12, as shown, are the most efficient and most practical in that they are possessed of unusual inherent strength and will not collapse or pull through on tightening of the bolt nor loosen from fastening engagement under constant strain, heavy usage and rough handling of an installation in which the fasteners are used. This is possible by reason of the fact that the sheet metal material of the fastening device from which such tongues are formed, is of less thickness than the pitch or spacing of the screw threads and such tongues tend, more effectively, to move toward each other and dig into the grooves intermediate adjacent threads on tightening of the bolt or screw and otherwise become embedded in the root diameter of such threaded member in locked, frictional fastening engagement therewith in applied fastening position. At the same time, the generally arched base 13 of the locking plate portion is substantially flattened under tension in such applied fastening position, and in attempting to assume its initial, normally untensioned, generally concave configuration, naturally causes the tongues thereof to exert an axial drawing action on the shank of the threaded fastener to provide a tight, rigid fastening of the parts secured under continuously effective spring tension. Thus any vibration, jarring or strain taking place in a completed mounting cannot cause displacement, reverse rotation or tend toward unscrewing of the threaded member from applied fastening position, and it will be further appreciated that in the provision of such integral bolt engaging elements in the fastening device of the present invention, the use of individual threaded nuts or lock washers of any kind is entirely dispensed with thereby making for a considerable saving not only in the cost of such nuts and lock washers, but also materially reducing the expense and labor involved in the tedious, time-consuming assembling operations which such fastenings require.

In addition to the locking plate portion thus provided, the fastener includes an attaching portion designed to hold the same in self-retained position on the supporting structure preparatory to the application of a bolt fastening thereto in securing a cooperating part to such supporting structure. The attaching portion comprises an attaching finger in the form of a shoulder 15 and lug 16, the same being preferably struck and formed from the fastener body which is otherwise arched or bowed as at 17 in the area of such attaching finger to provide for increased resilience therein and otherwise adapted to serve as a yieldable take up means in a manner and for a purpose presently to be described. Said lug 16 extends generally parallel to the fastener body and is spaced therefrom in normal untensioned relation, a distance slightly less than the thickness of the supporting structure. A locking detent 18 of any suitable character is also provided on the body and preferably by means of a small slit portion which is pressed out of the plane of the body such that the free end of the detent presents a relatively sharp shoulder adapted to positively engage the side wall of an aperture in the supporting structure. The engaging point of such detent is preferably spaced from the effective shoulder portion 15 of the attaching finger a distance substantially equal to or slightly less than that between the end walls of the assembling opening or slot 2, in the supporting structure, to firmly and rigidly engage therein in the final applied position of the fastener.

Accordingly, with the fastener thus provided and the supporting structure prepared with a suitable bolt passage 1 and assembling opening 2, substantially as shown in Fig. 1, the fastener may be easily and quickly attached to positive locked engagement with the supporting structure simply by inserting the attaching finger thereof in such assembling opening substantially as shown in Fig. 3 with the locking plate portion 10 in proximity to said bolt passage 1. By depressing the arched body portion 17 and simultaneously sliding the fastener forward, the lug 16 of the attaching finger will clear the underside of the supporting structure and permit the fastener to be advanced to its final applied fastening position to the point at which the shoulder 15 of the attaching finger engages the adjacent end wall of said assembling slot 2, substantially as shown in Fig. 2. At this position, the locking detent 18 is also received in the assembling slot in engagement with the opposite end wall thereof since it is provided with a proper spacing from the shoulder 15 of the attaching finger for this purpose and otherwise cooperates therewith in the assembling opening to lock the fastener in applied position on the supporting structure. Thus the extremity of the locking detent 18 and shoulder 15 of the attaching finger cooperate to engage the opposite end walls of the assembling slot and thereby also serve to prevent endwise displacement or rotative shifting movement of the fastener from final applied position. In this relation, the edges of the locking detent are disposed in substantial abutting engagement with the adjacent side-walls of the assembling slot as a further means maintaining the fastener in fixed, nonrotative applied position on the supporting structure. This is most important upon insertion and rotation of the bolt or screw fastening 19, Fig. 2, to threaded fastening engagement with the bolt engaging elements 11, 12 thereof in securing the cooperating part P to the supporting structure in completing any installation, while in a blind location, such substantially fixed, nonrotative attachment of the fastener in self retained position on the supporting structure is usually absolutely essential since the reverse side of the supporting structure is not readily accessible and it becomes impossible or inconvenient for the operator to hold the fastener while inserting and threadedly engaging the bolt fastening with the bolt engaging means thereof. Thus it will be appreciated that, in any event, a threaded fastener may be applied to threaded fastening engagement with the bolt fastening devices of the present invention by the usual securing operation taking place entirely from the accessible side of the supporting structure without the necessity for holding the fastening at the reverse side thereof during any such operation.

A most important advantage of a fastener of this character having a bowed or arched body 17 from which the attaching finger depends, resides in the fact that the same is thus provided with added resilience and is thereby admirably suited for use with supporting structures of different thicknesses since such body may be depressed as necessary to permit the lug 16 of the attaching finger to positively engage at the reverse side of any suitable supporting structure in self-retained position thereon substantially as shown in Fig. 2. It is to be understood however, that though such arched body is preferable, it is not absolutely essential; also, the locking detent 18 need not necessarily engage in the same assembling opening in the supporting structure as the attaching finger, but may be designed to be received in a separate recess therein to lock the fastener in applied fastening position in any manner equivalent to that shown and described. The present arrangement however is most practical in that the elongated assembling slot requires only a single opening to be punched, and by designing the attaching finger and locking detent to seat in such slot in the applied fastening position of the device as aforesaid, the assembly of the fasteners on the supporting structure may be performed with the greatest speed and facility.

Fig. 4 shows an alternate construction wherein the attaching portion of the fastener, designated generally 20, comprises a substantially flat section from which the attaching finger 21 and locking detent element 22 may be struck and formed for ready application to an apertured supporting structure of predetermined thickness, in which event the lug 23 of the attaching finger may be somewhat longer and is so bent as to have a normal spacing from the fastener body slightly less than the thickness of the supporting structure. The extremity thereof is preferably provided in the manner of a flared lip element 24 which facilitates application of the attaching finger to the self retained applied position of the fastener on the supporting structure with the lug portion thereof frictionally and grippingly engaging the supporting structure through the assembling slot 2 and the shoulder portion of the attaching finger and locking detent 22 disposed in positive locking engagement with the opposite end walls of such slot substantially in the manner described with reference to the form of the invention shown in Figs. 1 to 3 inclusive, whereupon the cooperating part P may be secured to the supporting structure by the bolt fastening 19 threadedly engaged with the bolt engaging elements 11, 12 of the locking plate portion 10 of the fastener.

Thus it will be appreciated that in any form of the invention the locking detent is snapped into the assembling opening in abutting relation with the adjacent side wall thereof and thereby cooperates with the attaching finger to prevent reverse movement or displacement of the fastener from applied fastening position on the supporting structure. If it is desired to remove the fastener, a suitable tool is employed to wedge the attaching portion from the supporting structure sufficient to displace the locking detent from its abutting relation in the assembling opening, whereupon the fastener may be slid reversely to disengage the attaching finger and permit the same to be removed. It will also be appreciated that in the use of these one-piece bolt fastening devices of the invention, there may be provided numerous installations which are superior and more advantageous in many respects than heretofore known clinch-on nut structures embodying conventional threaded nuts which of course require not only lock washers in providing a locked assembly, but also some extraneous means such as spot welding, riveting or cage devices to retain the nuts in applied position on the support preparatory to the application of the bolt fastening thereto. In addition, the integral bolt engaging means of the improved forms of bolt fastenings just described provide a considerable saving as compared to the costs involved in the use of threaded nuts, lock washers and cage devices, materially reduces the expense and labor incident to the tedious, time-consuming assembling operations which such fastenings require, and also eliminates entirely the costly riveting or spot welding operations heretofore necessary in providing such fastenings in related forms of joints and connections in metallic structures.

The attaching portions of either of the fasteners just described comprising the arched body section 17 of Figs. 1 to 3 inclusive or the flat type body shown in Fig. 4, may be readily embodied in various other forms of fastening devices designed to hold an object or part in mounted position on a supporting structure or to provide means by which a cooperating part may be secured thereto in a completed installation. Accordingly, the fastening device may be provided in the form of a retainer 30, Fig. 5, for a molding or other channel-shaped object such that both the fastener and molding may be applied in an operation taking place entirely from one side of the supporting structure in an installation which is especially advantageous in blind locations where the reverse side of a supporting panel or wall is not conveniently or readily accessible. A retainer of this character is provided with the usual attaching portion comprising an attaching finger 31 and locking detent 32 and on either end or side of such attaching portion, there are provided suitable spring arms 33, 34 onto which the molding or other channel shaped object 35 may be sprung to be retained in fixedly and rigidly mounted position on the supporting structure 36 as shown in Fig. 6, it being understood that one or more of such retainers as necessary are secured to the supporting structure along the path which the molding extends in mounted position and are attached in assembling openings 37 substantially in the manner described with reference to Figs. 1 to 4 inclusive.

Figs. 7 and 8 show further embodiments of the invention provided in the form of retaining means for conventional threaded nuts in the manner of substantial clinch-on nut devices. An ordinary threaded nut is often required in a blind location wherein it is necessary that the nut be held in alignment with a bolt passage in the supporting structure by some extraneous means preparatory to the application of a bolt fastening thereto for securing a cooperating part to the supporting structure. Although such fasteners are shown embodying the arched type body attaching portion 17 described with reference to Figs. 1 to 3 inclusive, it is quite obvious that similar devices may be provided having the flat type attaching portion 20 shown in Fig. 4. In either form, a nut carrying portion 40, Fig. 7, on the fastener, is provided with an aperture into which an integral collar portion 41 of the nut 42 is received. Such collar is peened or riveted in the aperture in the nut carrying portion 40, as shown, to hold the nut fixedly and rigidly thereon in the completed form of the fastener. The fastener may then be attached to the supporting structure S by means of its resilient attaching portion 17 applied to the assembling opening 2a in the general procedure described, with said nut 42 suitably aligned with the bolt passage 1a in position to receive bolt 44 to be applied thereto, the said collar 41 of the nut in such position seating in such bolt passage and otherwise serving as a substantial indexing means in this relation.

In Fig. 8 the fastener is provided with a nut carrying portion 45 comprising a return bend clip section 46 having an aperture into which a collar 47 of nut 48 is received to hold the nut on the supporting structure in alignment with the bolt passage 1a therein preparatory to the application of bolt fastening 49 thereto. Preferably the aperture in clip section 46 is D-shaped or of other flat sided configuration and the collar 47 of the nut of similar cross-section such that the nut is held by the fastener in fixed, non-rotatable position as the bolt fastening is threadedly engaged therewith.

Figs. 9 and 10 show a further embodiment of the invention comprising a modified type of attaching means which may be employed in any of the previously described forms of fasteners of the invention. With one end of the fastener formed with a locking plate portion 50 comprising integral bolt engaging means in the preferred type of substantial tongues 51, 52, an attaching portion is provided from the opposite end by a struck out finger comprising a shoulder 53 and a lug element 54 spaced from the fastener body a distance substantially equal to or slightly less than the thickness of the supporting structure S' and extending generally parallel to the body toward the adjacent free end of the fastener. A locking detent in the form of a pronounced tongue 55 is also struck from the body to extend in a direction opposite to that of the attaching finger with the extremity thereof spaced from the shoulder 53 thereof a distance slightly less than the diameter of the assembling opening 56. In applying the fastener, the attaching finger is inserted in the assembling opening and the fastener subjected to a longitudinal sliding movement sufficient to cause the lug element 54 to frictionally and grippingly engage the supporting structure with the shoulder 53 in contact with the adjacent side-wall of the assembling opening thereby permitting the locking tongue 55 to seat therein in positive abutting engagement with the opposite side-wall thereof under tension such that the fastener is securely locked against accidental displacement and unintentional removal in final applied position. In this relation the bolt engaging elements 51, 52 are disposed in substantial alignment with the bolt passage 57 in the supporting structure in position to threadedly engage fastener 58 for securing part P' thereto substantially in the manner described with reference to Figs. 1 to 4 inclusive.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a sheet metal body provided with bolt or screw thread engaging means and means for attaching the fastener in position on a supporting structure preparatory to the application of a bolt or screw thereto, said means for attaching the fastener comprising a substantial finger projecting to the underside of said fastener body in the form of a shoulder and a lug holding element spaced from said fastener body, said finger being receivable in an assembling opening in said supporting structure with said shoulder in abutting engagement with a side-wall of said opening and said lug holding element frictionally and grippingly engaging said supporting structure on the side opposite to that on which the fastener body is disposed in the final applied position of the fastener thereon, and a locking detent on said fastener body also projecting to the underside thereof in spaced relation to said shoulder of the attaching finger adapted to lock the fastener in such applied position on the supporting structure.

2. A fastening device comprising a sheet metal body provided with means for threadedly engaging a threaded fastener and means for attaching the device in position on a supporting structure preparatory to the application of the threaded fastener thereto, said means for attaching the fastening device comprising an attaching finger struck out from said body and presenting a shoulder and a lug element spaced from said body and receivable in an assembling opening in said supporting structure, said shoulder in the final applied position of the fastening device being disposed in substantial abutting engagement with a side-wall of said opening with said lug element frictionally and grippingly engaging said supporting structure on the side opposite to that on which the body of the fastening device is disposed, and a locking detent spaced from said shoulder of the attaching finger and adapted to lock the fastening device in such applied position on the supporting structure with the threaded fastener engaging means thereof overlying a bolt passage in the supporting structure in position to receive a threaded fastener applied thereto for securing a cooperating part to said supporting structure.

3. A fastener comprising a sheet metal body provided with bolt or screw thread engaging means and means for attaching the fastener in position on a supporting structure preparatory to the application of the bolt or screw thereto, said means for attaching the fastener comprising a substantial finger projecting to the underside of the fastener body in the form of a shoulder and a lug holding element spaced from said fastener body, said finger being receivable in an assembling opening in said supporting structure with said shoulder in abutting engagement with a side-wall of said opening and said lug holding element frictionally and grippingly engaging said supporting structure on the side opposite to that on which the fastener body is disposed in the final applied position of the fastener thereon, and a locking detent on said fastener body also projecting to the underside thereof in spaced relation to said shoulder of the attaching finger, said locking detent engaging an opposite side-wall of said assembling opening to lock the fastener in such applied position on the supporting structure.

4. A fastening device comprising a sheet metal body provided with means for threadedly engaging a threaded fastener and means for attaching the device in position on a supporting structure preparatory to the application of the threaded fastener thereto, said means for attaching the fastening device comprising an attaching finger struck out from said body and presenting a shoulder and a lug element spaced from said body and receivable in an assembling opening in said supporting structure, said shoulder in the final applied position of the fastening device being disposed in substantial abutting engagement with a side-wall of said opening with said lug element frictionally and grippingly engaging said supporting structure on the side opposite to that on which the body of the fastening device is disposed, and a locking detent spaced from said shoulder of the attaching finger and engageable with an opposite side-wall of said opening to lock the fastening device in such applied position on the supporting structure with the threaded fastener engaging means thereof overlying a bolt passage in the supporting structure in position to receive a threaded fastener applied thereto for securing a cooperating part to said supporting structure.

5. A fastener comprising a sheet metal body provided with bolt or screw thread engaging means and means for attaching the fastener in position on a supporting structure preparatory to the application of the bolt or screw thereto, said means for attaching the fastener comprising a substantial finger projecting to the underside of said fastener body in the form of a shoulder and a lug holding element spaced from said fastener body, said lug holding element being receivable in an assembling opening in said supporting structure to cooperate with the fastener body in engaging opposite sides of the supporting structure to retain the fastener thereon, said fastener body being of generally bowed configuration to adapt said lug holding element for engaging supporting structures of various thicknesses under spring tension.

6. A fastener comprising a sheet metal body provided with bolt or screw thread engaging means and means for attaching the fastener in position on a supporting structure preparatory to the application of the bolt or screw thereto, said means for attaching the fastener comprising a substantial finger projecting from the undersurface of said fastener body in the form of a shoulder and a lug holding element spaced from said fastener body, said finger being receivable in an assembling opening in said supporting structure with said shoulder in abutting engagement with a side-wall of said opening and said lug holding element cooperating with the fastener body to engage opposite sides of the supporting structure to retain the fastener in applied position thereon, and a locking detent on said fastener body also projecting from the undersurface thereof in spaced relation to said shoulder of the attaching finger adapted to lock the fastener in such applied position on the supporting structure, said fastener body being of generally bowed configuration to adapt said lug holding element of the attaching finger for engaging supporting structures of various thicknesses.

7. A fastener comprising a sheet metal body provided with bolt or screw thread engaging means and means for attaching the fastener in position on a supporting structure preparatory to the application of the bolt or screw thereto, said means for attaching the fastener comprising a substantial finger projecting to the underside of said fastener body in the form of a shoulder and a lug holding element spaced from said fastener body, said finger being receivable in an assembling opening in said supporting structure with said shoulder in abutting engagement with a side-wall of said opening and said lug holding element cooperating with the fastener body to engage opposite sides of the supporting structure to retain the fastener in applied position thereon, and a locking detent on said fastener body also projecting to the underside thereof in spaced relation to said shoulder of the attaching finger, said locking detent engaging an opposite side wall of said opening to lock the fastener in such applied position on the supporting structure, said fastener body being of generally bowed configuration to adapt said lug holding element of the attaching finger for engaging supporting structures of various thicknesses.

8. A fastener comprising a sheet metal body provided with bolt or screw thread engaging means and means for attaching the fastener in position on a supporting structure preparatory to the application of the bolt or screw thereto, said means for attaching the fastener comprising a struck out substantial finger projecting to the underside of said fastener body in the form of a shoulder and a lug holding element spaced from said fastener body, said finger being receivable in an assembling opening in said supporting structure with said shoulder in abutting engagement with a side-wall of said opening and said lug holding element cooperating with the fastener body to engage opposite sides of the supporting structure in the final applied position of the fastener thereon, and a locking detent on said fastener body also projecting to the underside thereof in spaced relation to said shoulder of the attaching finger adapted to engage in said assembling opening to lock the fastener in such applied position on the supporting structure with said bolt or screw thread engaging means thereof overlying a bolt passage in said supporting structure in position to receive a bolt or screw for securing a cooperating part thereto, said fastener body being of generally bowed configuration to adapt said lug holding element of the attaching finger for engaging supporting structures of various thicknesses.

9. A fastener comprising a sheet metal body provided with bolt or screw thread engaging means and means for attaching the fastener in position on a supporting structure preparatory to the application of the bolt or screw thereto, said means for attaching the fastener comprising a struck out substantial finger projecting to the underside of said fastener body in the form of a shoulder and a lug holding element spaced from said fastener body, said finger being receivable in an assembling slot in said supporting structure with said shoulder in abutting engagement with an end wall of said slot and said lug holding element cooperating with the fastener body to engage opposite sides of the supporting structure in the final applied position of the fastener thereon, and a locking detent on said fastener body also projecting to the underside thereof in spaced relation to said shoulder of the attaching finger adapted to engage in said assembling slot to lock the fastener nonrotatively in such applied position on the supporting structure with said bolt or screw thread engaging means thereof overlying a bolt passage in said supporting structure in position to receive a bolt or screw for securing a cooperating part thereto, said bolt or screw thread engaging means comprising integral thread engaging elements pressed from a locking plate portion of said fastener body.

10. A fastener comprising a sheet metal body provided with means for attaching the fastener in position on a supporting structure and means for retaining an object on said supporting structure, said means for attaching the fastener comprising a substantial finger struck out from said body to project from the undersurface thereof and present a shoulder and a lug holding element spaced from said fastener body, said lug holding element being receivable in an assembling opening in said supporting structure to cooperate with the fastener body in engaging opposite sides of the supporting structure to retain the fastener thereon, said fastener body being of generally bowed configuration to adapt said lug holding element for engaging supporting structures of various thicknesses under spring tension.

11. A fastener comprising a sheet metal body provided with means for attaching the fastener in position on a supporting structure and means for retaining an object on said supporting structure, said means for attaching the fastener comprising a struck out substantial finger projecting from the undersurface of said fastener body and presenting a shoulder and a lug holding element spaced from said fastener body, said finger being receivable in an assembling slot in said supporting structure with said shoulder in abutting engagement with an end wall of said slot and said lug holding element cooperating with the fastener body to engage opposite sides of the supporting structure in the final applied position of the fastener thereon, and a locking detent on said fastener body also projecting from the undersurface thereof in spaced relation to said shoulder of the attaching finger adapted to engage in said assembling slot to lock the fastener in such applied position on the supporting structure.

12. A fastener comprising a sheet metal body provided with means for attaching the fastener in position on a supporting structure and means for retaining an object on said supporting structure, said means for attaching the fastener comprising a struck out substantial finger projecting from the undersurface of said fastener body and presenting a shoulder and a lug holding element spaced from said fastener body, said finger being receivable in an assembling opening in said supporting structure with said shoulder in abutting engagement with a side-wall of said opening and said lug holding element cooperating with the fastener body to engage opposite sides of the supporting structure in the final applied position of the fastener thereon, and a locking detent on said fastener body also projecting from the undersurface thereof in spaced relation to said shoulder of the attaching finger adapted to engage in said assembling opening to lock the fastener in such applied position on the supporting structure, said fastener body being of generally bowed configuration to adapt said lug holding element for engaging supporting structures of various thicknesses under spring tension.

13. A fastener comprising a sheet metal body provided with means for attaching the fastener in position on a supporting structure and means for retaining an object on said supporting structure, said means for attaching the fastener comprising a struck out substantial finger projecting from the undersurface of said fastener body in the form of a shoulder and a lug holding element spaced from said fastener body, said finger being receivable in an assembling slot in said supporting structure with said shoulder in abutting engagement with an end wall of said slot and said lug holding element cooperating with the fastener body to engage opposite sides of the supporting structure in the final applied position of the fastener thereon, and a locking detent on said fastener body also projecting from the undersurface thereof in spaced relation to said shoulder of the attaching finger adapted to engage the opposite end wall of said assembling slot to lock the fastener in such applied position on the supporting structure, said means for retaining an object on the supporting structure comprising a substantial spring arm bent from a portion of said fastener body.

14. A fastener comprising a sheet metal body provided with means for attaching the fastener in position on an apertured supporting structure and means for retaining an object on said supporting structure, said means for attaching the fastener comprising a struck out substantial finger projecting from the undersurface of said fastener body in the form of a shoulder and a lug holding element spaced from said fastener body, said finger being receivable in an assembling slot in said supporting structure with said shoulder in abutting engagement with an end wall of said slot and said lug holding element cooperating with the fastener body to engage opposite sides of the supporting structure in the final applied position of the fastener thereon, and a locking detent struck from said fastener body and also projecting from the undersurface thereof in spaced relation to said shoulder of the attaching finger, said locking detent being adapted to engage the opposite end wall of said assembling slot to lock the fastener in such applied position on the supporting structure, said means for retaining an object on the supporting structure comprising a substantial spring arm bent from a portion of said fastener body, and said fastener body being of generally bowed configuration to adapt said lug holding element for engaging supporting structures of various thicknesses under spring tension.

GEORGE A. TINNERMAN.